United States Patent
Smolders (10) Patent No.: US 7,975,967 B2
(45) Date of Patent: Jul. 12, 2011

(54) AUTOMATIC ACTIVATION DEVICE FOR A PARACHUTE AND A METHOD FOR ACTIVATING AN OPENING OF A PARACHUTE

(75) Inventor: Jo Smolders, Wespelaar (BE)

(73) Assignee: Socofimmo Holding S.A., Luxembourg (LU)

( * ) Notice: Subject to any disclaimer, the term of this patent is extended or adjusted under 35 U.S.C. 154(b) by 869 days.

(21) Appl. No.: 11/892,421

(22) Filed: Aug. 22, 2007

(65) Prior Publication Data

US 2008/0111029 A1    May 15, 2008

(30) Foreign Application Priority Data

Aug. 24, 2006  (EP) .................................. 06119504

(51) Int. Cl.
  *B64D 17/56*  (2006.01)
  *B64D 17/54*  (2006.01)
(52) U.S. Cl. ........................ 244/149; 244/150
(58) Field of Classification Search ................. 244/142, 244/147, 149, 150, 151 B, 152, 122 AE
See application file for complete search history.

(56) References Cited

U.S. PATENT DOCUMENTS

| 3,667,705 | A  |   | 6/1972  | Synder |
| 4,603,823 | A  | * | 8/1986  | Ayoub ..................... 244/122 AE |
| 4,835,716 | A  | * | 5/1989  | Tamaki et al. ................... 702/50 |
| 5,825,667 | A  | * | 10/1998 | Van Den Broek ............ 244/149 |
| 7,040,580 | B1 |   | 5/2006  | Cloth |
| 7,073,752 | B2 | * | 7/2006  | Voronka et al. ................ 244/149 |

FOREIGN PATENT DOCUMENTS

| EP | 0 785 130 A1 | 7/1997 |
| EP | 0 838 395 A2 | 4/1998 |
| EP | 1 084 950 B1 | 5/2002 |
| GB | 2032860 A * | 5/1980 |

* cited by examiner

*Primary Examiner* — Tien Dinh
*Assistant Examiner* — Richard R Green
(74) *Attorney, Agent, or Firm* — Jacobson Holman PLLC (57) ABSTRACT

An automatic activation device for a parachute has a pressure input for inputting a pressure value and is provided for operating in selectable working configurations according to which a reference pressure is determined either on the basis of the input pressure value or on the basis of a QNH value. Preferably the device can also operate in another selectable working configuration, where a preset time and a reference fall down speed are used.

17 Claims, 5 Drawing Sheets

AUTOMATIC ACTIVATION DEVICE FOR A PARACHUTE AND A METHOD FOR ACTIVATING AN OPENING OF A PARACHUTE

The present invention relates to an automatic activation device for a parachute, said device having pressure input means, provided for inputting a pressure value, said pressure input means being connected to a processing element, provided for determining a reference pressure, which in a first working configuration of said processing element is determined on the basis of a first pressure value, input at said pressure input means and indicating an actual atmospheric pressure value at a take-off zone, said processing element being further provided for determining during a jump, executed by a jumper, a series of subsequent pressure values, wherein each pressure value of said series is determined on the basis of a second pressure value, input at said pressure input means and indicating an atmospheric pressure value above a drop zone at the height where said jumper is at the moment when said second pressure value is input into said pressure input means, said processing element being also provided for determining each time on the basis of said reference pressure and at least two subsequent pressure values of said series, a time value indicating an evaluated time for reaching said reference pressure and for generating a correspondence signal upon establishing that said time value has reached a predetermined value, said processing element being further provided for determining on the basis of subsequently determined pressure values of said series, a first fall down speed value indicating a speed at which said jumper falls down, said processing element being further provided for comparing under control of said correspondence signal, said first fall down speed with a reference fall down speed and for generating a control signal, when said first fall down speed corresponds to, or is higher than said reference fall down speed, said processing element being connected to an activation element, which is provided for activating an opening of said parachute under control of said control signal.

Such a device is known from EP 1 084 950. In the known device a reference pressure is determined on the basis of a first pressure value, which corresponds to the actual atmospheric pressure value at the take-off zone. If the take-off zone and the drop zone are not the same, then a height difference between both zones is also supplied to the processing element and the reference pressure is determined by also taking into account this height difference. In the known device, a time value is further determined, which time value indicates an evaluated time for reaching the reference pressure, which corresponds to a particular height at which the parachute should normally be open. If this reference pressure has been reached, the first fall down speed is determined and if this speed is equal to or higher than a first reference speed, a control signal will be generated, which control signal will cause the activation element to be active and open the parachute. In such a manner, the automatic activation device acts as a security device and takes care that the parachute has been opened before the jumper reaches the ground at the drop zone.

Initialisation of an automatic activation device for a parachute can however be done in another way then by using the actual atmospheric pressure value at the take-off zone. So, for example for military purposes the QNH value is used. The actually known devices are however not able to operate in different working configurations and consequently for each working configuration a separate automatic activation device for a parachute is required. The drawback is thus not only that different separate devices could be required, but also that there is a possibility that the wrong device is selected.

The object of the present invention is to realise an automatic activation device for a parachute, which device is provided for working in different working configurations while using a same single device.

For this purpose, an automatic activation device for a parachute according to the present invention is characterised in that said device comprises a QNH input, provided for inputting a QNH value as well as an elevation value, indicating a height difference between mean sea level and the height of the drop zone, said processing element being provided to operate in a second working configuration in which said reference pressure is determined on the basis of said QNH value and said elevation value, said device comprising selection means provided for enabling a selection between said first and second working configuration. By providing a QNH input and enabling the processing element to operate in a second working configuration, the reference pressure can be determined with the same device and based on the QNH value and the elevation value.

According to a further embodiment, the automatic device according to the invention is characterised in that said device further comprises a time input for inputting a preset time, said processing element being provided to operate in a third working configuration in which a reference fall down speed is predetermined, said processing element being further provided for determining, under control of said input reference fall down speed and on the basis of subsequent pressure values of said series, a second fall down speed value, indicating a second speed at which said jumper falls down, said processing element being provided for comparing within said third working configuration said second fall down speed with said reference fall down speed and for generating a start signal when said second fall down speed has reached said reference fall down speed, said processing element being further provided for generating within said third working configuration said control signal when a period equal to said preset time has lapsed after generation of said start signal, said selection means being also provided for selecting said third working configuration. By providing a time input and enabling the processing element to operate according to the third working configuration, the same automatic activation device can work by using a reference fall down speed instead of a reference pressure. Thus the device according to the present invention is capable of working according to three different working configurations, each of them being selectable by the user who, for this purpose, uses the selection means. The gist of the present invention is to take advantage from the fact that based on the input pressure value not only a reference pressure can be determined but also a fall down speed value. So, in the first and second working configurations, only the manner according to which the reference pressure is determined differs. In the third working configuration full advantage is taken from the fact that based on input pressure values the falling speed is determined. By inputting the time value, the control signal can be generated when, after having reached the reference speed, the preset time value has passed by.

A first preferred embodiment of an automatic activation device according to the present invention is characterised in that said processing element comprises a memory provided for storing a set of predetermined altitude values, to each predetermined altitude value there being associated a dedicated one of said reference fall down speed, said selection means being connected to said memory and provided for selecting one of the predetermined altitude values of said set with its associated reference fall down speed. The predetermined altitude value and its associated second reference speed depend on the operational mode i.e. PRO, STUDENT or TANDEM. For military purposes the operational mode is however PRO, BUNDLE or TANDEM. By using the memory, the device can operate in each operational mode.

A second preferred embodiment of an automatic activation device according to the present invention is characterised in that said processing element is provided for determining said pressure value by successively sampling said pressure and by determining an average value from each time a predetermined amount of successively sampled pressures. By determining an average value, peak values, due to sudden changes, are considerably eliminated.

A third preferred embodiment of an automatic activation device according to the present invention is characterised in that said device comprises a time period indicator having a further memory, said time period indicator being provided for receiving said monitoring signal and for storing into said further memory, under control of said monitoring signal, an actual time period indicated by said time indicator upon receipt of said monitoring signal. The use of a time period indicator enables to trace at what time a control signal was generated and in such a manner to collect valuable information about what happened when the control signal was generated.

A fourth preferred embodiment of an automatic activation device according to the present invention is characterised in that said device comprises a three axis linear accelerometer connected to said processing element and provided for detecting an acceleration value caused by a speed change in a fall down direction of said jumper and for generating an acceleration signal upon detection that said acceleration value exceeds a predetermined threshold value, said processing element being provided for validating said control signal before transmitting it to said activation element upon establishing that said acceleration signal has been generated. The use of a three axis linear accelerometer enables to determine, independently from the measured pressure if the jumper indeed falls down. The control signal, which causes the automatic activation of the parachute is in this embodiment only validated if the acceleration signal is generated i.e. when the accelerometer has indeed established that the acceleration exceeds a threshold value. In such a manner, there is avoided that the control signal is generated by accident, caused by an incorrect pressure measurement for example due to a too fast pressure rise inside the plane. In such a manner the generation of the control signal will not lead to an automatic opening of the parachute.

The invention also relates to a method for activating an opening of a parachute.

The invention will now be described in more details with reference to the annexed drawings.

In the drawings a same reference sign has been allocated to a same or an analogous element.

Figure 1:
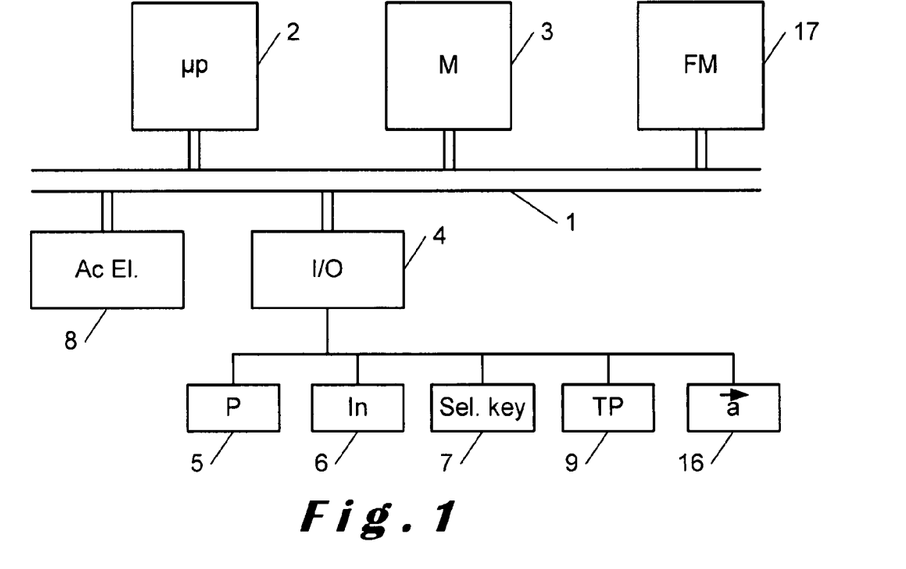
FIG. 1 shows schematically an embodiment of an automatic activation device for a parachute according to the invention.

The automatic activation device according to the present invention and illustrated in FIG. 1, comprises a communication bus 1, to which a processing element 2, for example formed by a microprocessor, is connected. A memory 3 and an interface 4 are further connected to the bus 1. A further memory 17, preferably formed by a FIFO, is also connected to the bus. This further memory is provided for storing data relating to the jump and accessible by the user in order to read the stored information. A pressure input means 5, for example formed by a pressure sensor is connected to the interface 4. An input key 6, for example formed by a scrolling button, is also connected to the interface 4. A selection key 7 is further connected to the interface 4. A time period indicator 9 (TP) and a three axis linear accelerometer ($\vec{a}$) (16) are further connected to the interface 4. An activation element 8, formed for example by a cutter is also connected to the bus.

Figure 2:
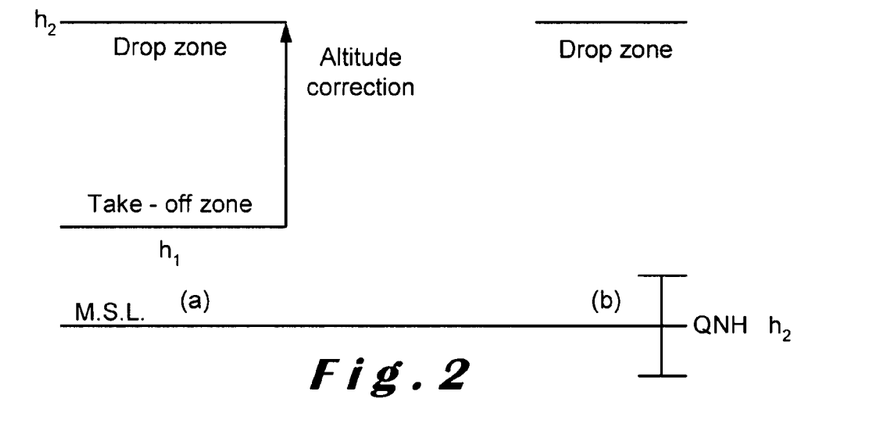
FIG. 2 illustrates conceptually the first and second working configuration.

Before further describing the construction and operation of the automatic activation device and method according to the invention, it is necessary, for the sake of clarity, to describe conceptually the different working configurations. In a first working configuration as illustrated in FIG. 2a, the height and atmospheric pressure of the take-off zone (h1) and drop zone ($h_2$) are considered. In FIG. 2a the drop zone is shown as being higher than the take-off zone. This is however only done for illustrative purposes. Indeed, it could very well be that the drop zone and the take-off zone are located at a same height, which is certainly the case when the parachute jumper will land on the take-off zone. It could also be that the drop zone is lower than the take-off zone, which is for example the case when the parachute jumper starts from a take-off zone land inwards and jumps at the coast. The lowest line, indicated by M.S.L. represents the Mean Sea Level. So, before jumping, the parachute jumper will have the actual atmospheric pressure of the take-off zone recorded by the device. This actual atmospheric pressure is input via the input means 5. As the atmospheric pressure and the altitude are related to each other, the input actual atmospheric pressure value will reflect the altitude of the take-off zone. In case that the drop zone is different from the take-off zone, the jumper will have to apply an altitude correction by using the input key 6. The device is provided to apply an altitude correction of +/−2000 m (or 6000 feet). After the user has set the appropriate altitude correction, the device will convert this altitude correction in a pressure correction.

It should be noted that the word "jumper", used in the description of the present invention, does not only mean a person using a parachute it could also signify a load that is dropped from a plane during the flight of the latter or a person carrying a load and jumping with it. The word parachute used in the present description covers the main parachute, the reserve parachute or even both.

In a second working configuration, which is generally used in military applications, the QNH value is used rather than the actual atmospheric pressure at the take-off zone. The QNH is a Q-code used by pilots, air traffic controls (ATC) and low frequency weather beacons to refer to the current main air pressure over a given region at sea level. The QNH allows a pilot to know his altitude with respect to the main sea level (MSL). The QNH value uses a ground zero level that corresponds to the mean see level as reference value. So, if the user wants to use the QNH value, he has to select the second working configuration by means of the selection key 7. The QNH value indicates the actual atmospheric pressure at a selected location by having as reference pressure the pressure at mean see level of the selected location. The QNH is generally expressed in hPa or millebar. If the user has selected to work with the QNH value, he will ask the station in charge designated for the drop zone, to send him the QNH value for the drop zone (QNH $h_2$). When this QNH $h_2$ value has been received, the user will input it into the device. It should be noted that the QNH $h_2$ value can also be set in the plane before dropping.

In a third working configuration, the jumper inputs by means of the input key 6 a preset time value and selects this third working configuration by means of the selection key 7. In this third working configuration, the speed at which the jumper falls down is monitored. Once this speed has reached a preset reference speed, the control signal is generated within the time period set by the preset time value in order to open the parachute.

In first and second working configurations, the jumper can chose between three operational modes called "PRO", "TANDEM" and "STUDENT" (or "BUNDLE" for military applications). This selection is also made by using the selection key 7. For each operational mode there is a predetermined activation altitude value and a second reference speed, associated to this activation altitude value. The table that follows gives a sample of those values.

| Mode | Activation altitude value | Second reference speed |
|---|---|---|
| Pro | 256 m | 35 m/s |
| Tandem | 622 m | 35 m/s |
| Student | 317 m | 20 m/s |
| Bundle | 256 m | 29 m/s |

These different values are stored in the memory 3 of the device.

Figure 3:
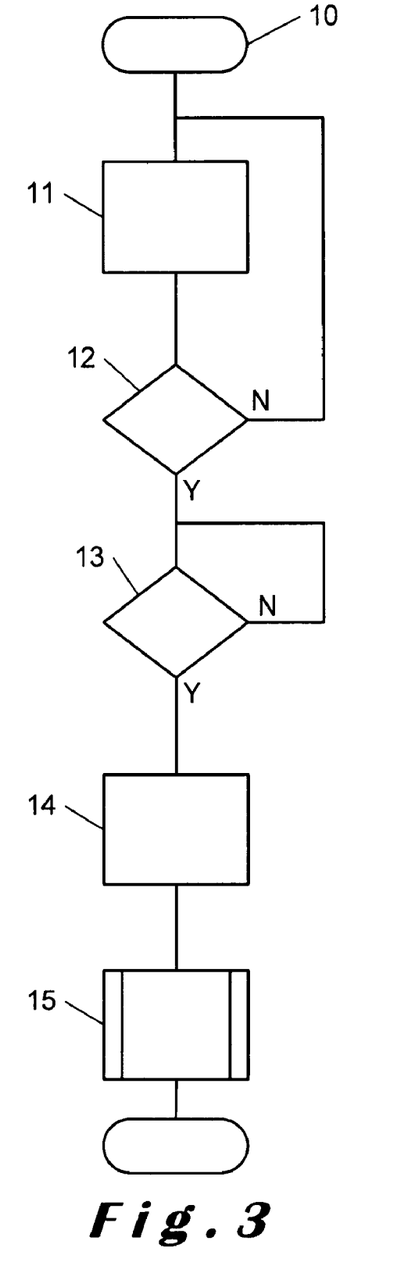
FIG. 3 illustrates the selection between the working configuration in combination with the modes.

FIG. 3 illustrates, by means of a flow chart how in the automatic activation device according to the present invention each of the three working configurations are initialised. After switching on (10) the device, the jumper receives a message (11) requesting him to select the working configuration. The use of such a message could be optional after the first time a selection was made. In the latter case, the device could by default select the working configuration that has been selected previously. The device, which is controlled by the processing element 2 for executing the different steps illustrated in the flow charts of FIGS. 3 and 4 then waits (12) until the user enters his selection. Once the working configuration has been selected (12; y) the device requests (13) the user which mode ("PRO"; "TANDEM"; "STUDENT" or "BUNDLE") he wants. Once the user has chosen the requested mode (13; Y), the device is set (14) in the requested working configuration combined with the requested mode. For this purpose, the processing element addresses the memory 3 where a set of predetermined altitude values, associated with a second reference speed, are stored. The selected mode is transformed into an address where in the memory the predetermined altitude value with its associated second reference fall down speed is stored. The data stored at the addressed memory location is then read and the read information is supplied to the processing element. Once the requested working configuration with the mode is selected and initialised, the processing element jumps to the execution routine (15) associated with the selected working configuration.

Figure 4:
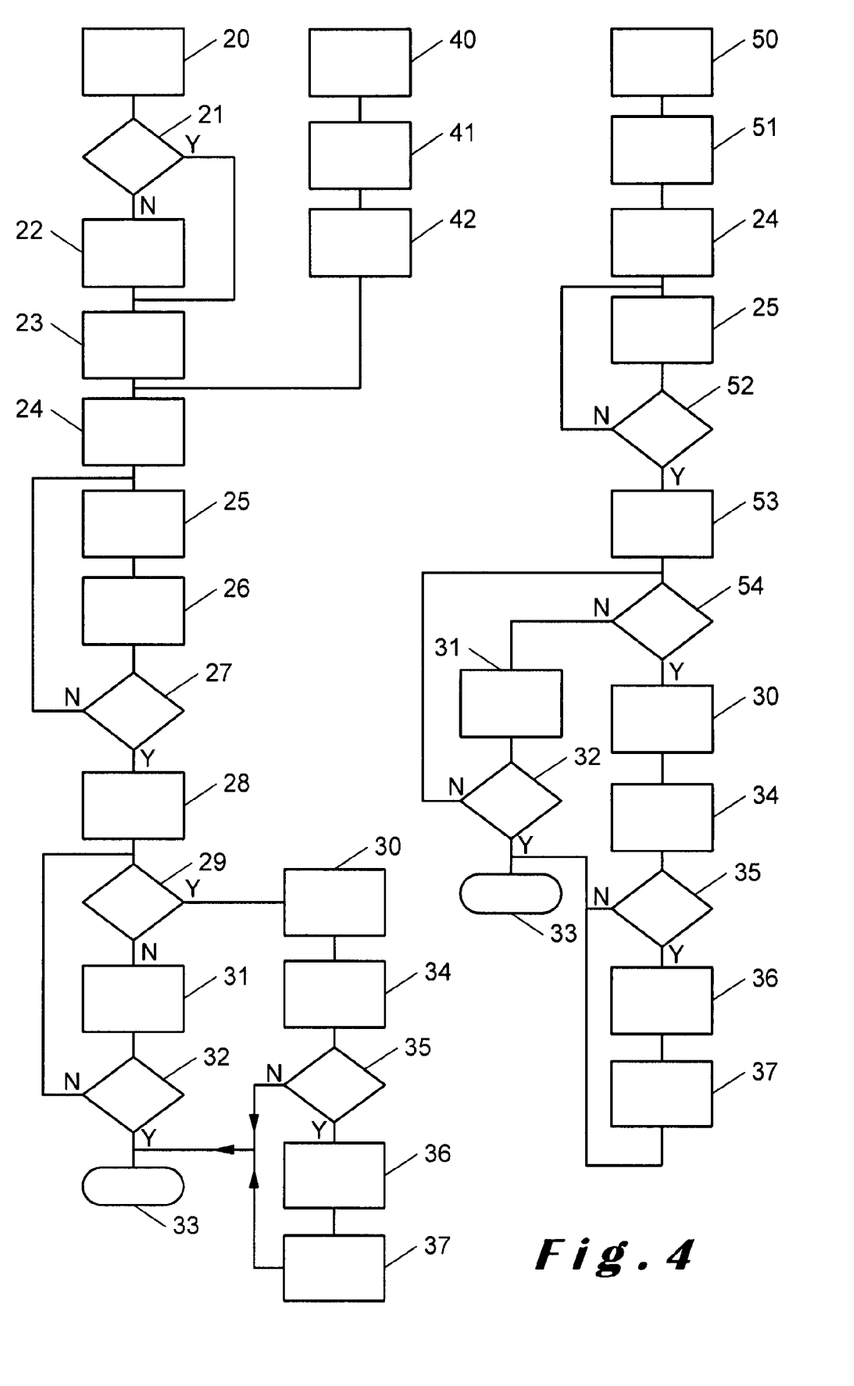
FIG. 4 illustrates by means of a flow chart each time the different steps performed in the different working configurations.

Suppose the jumper has selected the first working configuration so that the processing element has addressed the appropriate routine for operating according to this first working configuration. In this configuration, the processing element will collect (20) from the pressure input means 5 a first pressure value indicating an actual atmospheric pressure value at the take-off zone. Thereafter, the processing element will request (21) the jumper whether the take-off zone is the same as the drop zone. If both zones are not the same (21; N), then the jumper is requested (22) to provide an altitude correction value in order to enable the processing element to know the altitude of the drop zone or at least the altitude difference between take-off and drop zone.

After having received the actual atmospheric pressure at the take-off zone and the data relating to the drop zone and knowing in which mode (PRO, STUDENT or BUNDLE, TANDEM) the jumper wants the device to operate, the processing element will determine (23) a reference pressure. This reference pressure is determined on the basis of the first pressure value, the selected mode (if the latter choice is available) and the altitude correction, if any.

During a jump, the processing element will subsequently read (24) second pressure values input at said pressure input means 5. Those second pressure values indicate an atmospheric pressure value above the drop zone at the height where the jumper is at the moment when the second pressure value is input into the pressure input means. As a fall down movement is performed, the pressure value will continuously change during this fall down movement. Therefore, the second pressure value is monitored and sampled during the jump. As, for example, due to turbulences or thermal peaks the atmospheric pressure could suddenly change for a short time, it is preferred to average the measured second pressure values over a predetermined number of samples. In such a manner, sudden changes do not adversely affect the measured atmospheric pressure value.

Figure 5:
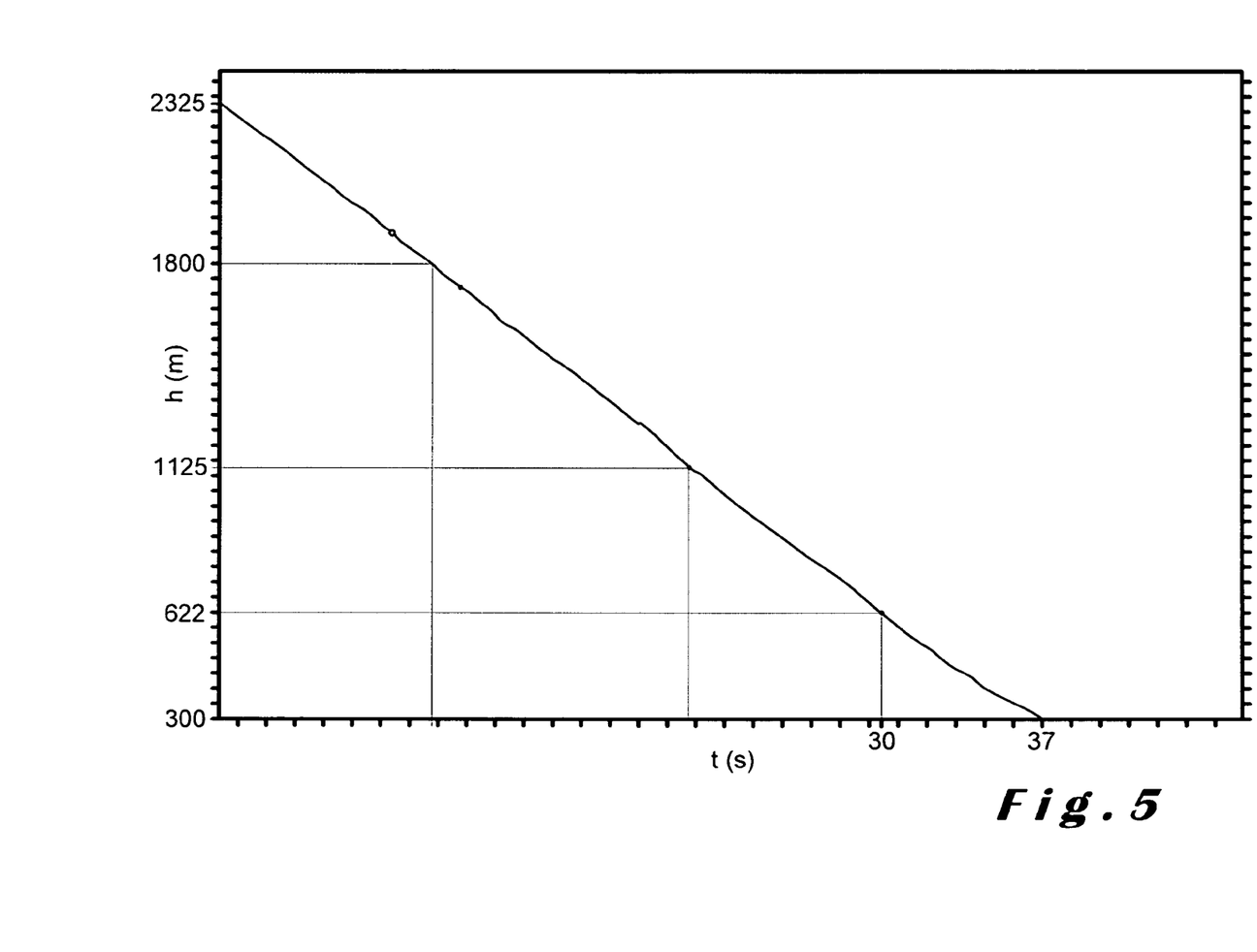
FIG. 5 illustrates the height/time function during a jump.

Since the atmospheric pressure, felt by the jumper, changes continuously, the processing element will determine each time on the basis of the read pressure values a series of subsequent pressure values. The processing element will temporarily store (25) each pressure value of said series which was determined on the basis of at least two subsequent pressure values, which have been stored. The processing element will determine (26), by also using the reference pressure value, determined under step 23, a time value (26) indicating an evaluated time for reaching the reference pressure. This concept is illustrated in FIG. 5, which shows a fall down curve, where height (h) and time (t) are expressed in function of each other. In FIG. 5, the jumper started his jump at a height of 2 325 m and 30 seconds were necessary to reach a height of 622 m. Suppose now that the jumper has chosen the tandem mode with a reference height (rh) of 622 m. The reference pressure will then correspond to the pressure at the reference height of 622 m.

By using two successive pressure values of the series, the processing element can determine the height at which the jumper actually is. Suppose this height is 1.8 Km. From FIG. 5 it can then be read that a time $\Delta T=20$ sec is required to reach the height of 622 m corresponding to the reference pressure. More details on how to determine the curves of FIG. 5 are given in EP 1 084 950, which is incorporated by reference in the present application.

After having determined the time value $\Delta T$, the processing element will verify (27) if the time value has reached a predetermined value, for example $\Delta T=0$, indicating that the reference pressure value corresponds to the input pressure value. It will of course be clear that the present invention is not limited to the example of ΔT=0 and that a verification based on another value of ΔT could also be considered. If the time value has not reached said predetermined value, the steps 25, 26 and 27 are executed again until the time value has reached the predetermined value i.e. the jumper continues to fall down until the predetermined height has been reached. If the time value has reached (27; Y) the predetermined value, the processing element will generate (28) a correspondence signal.

The determination under step 25 of the subsequent pressure values also enables to determine a first fall down speed value, indicating a speed at which the jumper falls down. Indeed, between two subsequent pressure values a time Δt passed by. The pressure difference ΔP between the two successive pressure values in combination with the time ΔT (ΔP/ΔT) enables to determine a fall down speed (v) in the vertical direction. Since during the fall of the jumper, a series of subsequent pressure values are determined, there are consequently also determined a series of subsequent first fall down speeds.

Under control of the correspondence signal generated under step 28, the processing element will compare (29) the determined actual first fall down speed with a reference fall down speed. The latter will, as described here before, depend on the mode chosen by the jumper. If the first fall down speed is equal to or higher than the reference fall down speed, this signifies that the jumper is falling down too rapidly and that thus consequently his parachute has not been opened. So, if the first fall down speed is too high or equal to the reference fall down speed (29; y), the processing element will generate (30) a control signal. If on the other hand, the first fall down speed is lower than the reference fall down speed (29; N), the processing element will determine again the first fall down speed (31) and verify (32) if the first fall down speed equals zero i.e. verify if the jumper has reached the ground. If the jumper did not reach the ground (32; N) the steps are repeated as from step 29. The processing element steps to a stand by mode (33), if a time frame of for example 120 seconds has passed since the execution of step 32.

After generation of the control signal (step 30), the processing element preferably reads (34) an acceleration value such as determined by the three axis linear accelerometer 16. The latter is provided for detecting an acceleration value caused by a speed change in a fall down direction of the jumper. Indeed, when the jumper falls down, the fall down speed in the downward direction will change, thereby causing an acceleration, which will be detected by the accelerometer 16. If on the other hand, the jumper is not falling down, but the automatic activation device is transported in a plane, a car or another vehicle, the accelerometer will detect a horizontal speed change and perhaps a small vertical speed change. The accelerometer thus generates an acceleration value indicating not only an absolute speed change value, but also having a directional component.

After having read (34) the acceleration value, the processing element will verify (35) if the acceleration value in the fall down direction exceeds a predetermined threshold value. In such a manner, it can be established if the jumper is indeed falling down or not. When the acceleration value exceeds the predetermined threshold value (35; y), the processing element will generate (36) an acceleration signal that will validate (37) the control signal generated at step 30. If no acceleration signal is generated, there is stepped to step 33. It should be noted that the use of an accelerometer is independent from the possibility to operate with a same device in a plurality of working configurations.

The control signal will then be sent to an activation element 8 connected to the bus 1. This activation element is provided for activating an opening of the parachute under control of the control signal. So, if the jumper falls down too rapidly, the activation element will cause the parachute to open under control of the validated control signal thereby providing a safe landing for the jumper.

Figure 6:
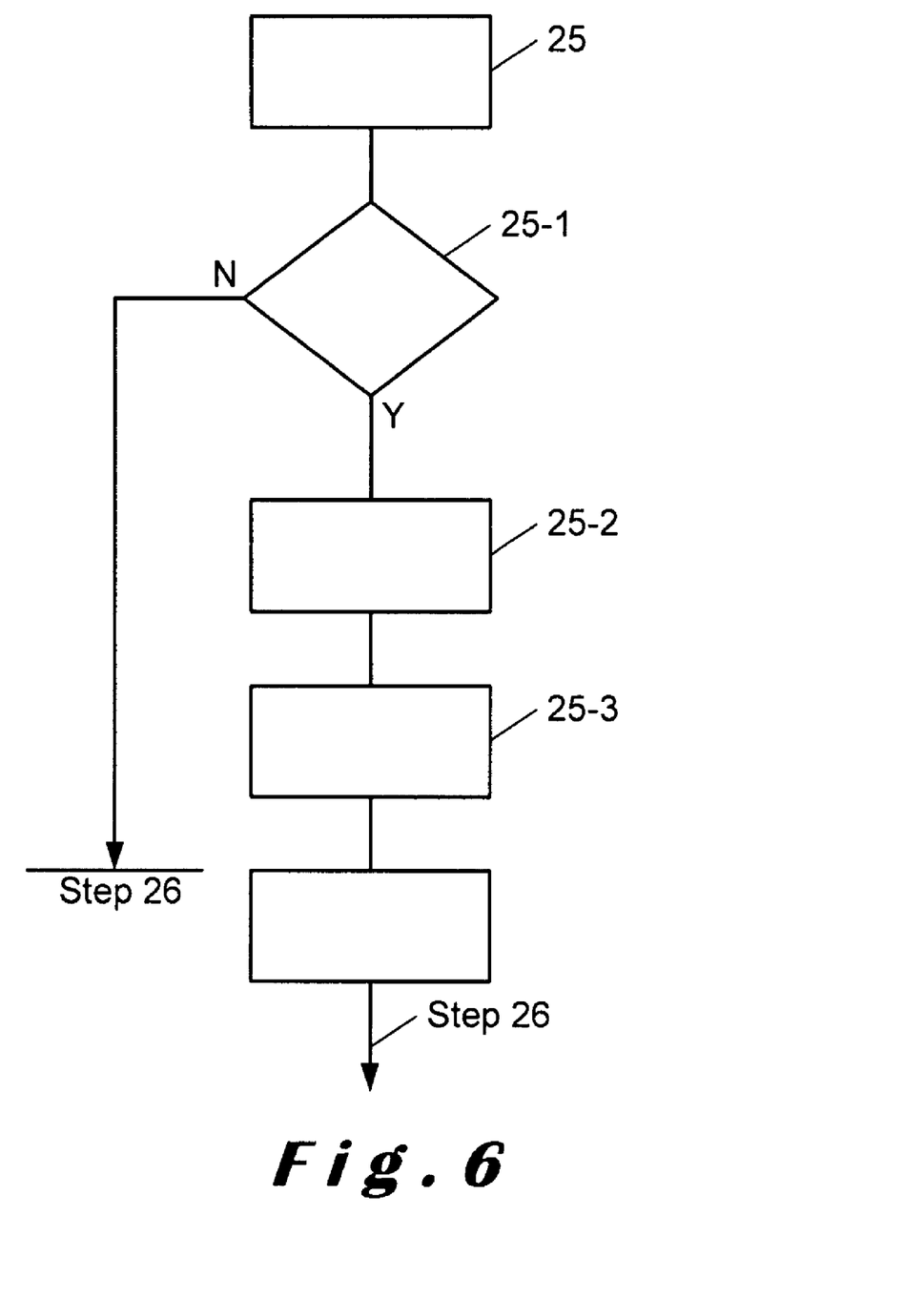
FIG. 6 illustrates by means of a flow chart a monitoring sub-routine.

According to another embodiment of the present invention, another safeguard measure could be built in into the device. In the latter embodiment step 25 comprises a subroutine which is illustrated in FIG. 6. This subroutine is executed by a monitoring unit that is part of said processing element. In this subroutine, the first fall down speed determined under step 25 is compared (25-1) with the reference fall down speed belonging to the selected mode. If the first fall down speed is lower (25-1; N) than the reference fall down speed, then there is jumped back to step 26 of the main routine. If on the other hand, the first fall down speed is equal to or higher than the reference fall down speed, then the monitoring unit generates (25-2) a monitoring signal. The generation of the monitoring signal signifies that, although the reference pressure has not been reached, the speed at which the jumper falls down is too high, which could endanger the life of the jumper. When this happens, the jump data will be stored in the further memory 17.

The generated monitoring signal is transmitted (25-3) to the time period indicator 9. The latter preferably comprises a clock, which could be the one of the processing element. The clock is connected to a counter, preferably a six digit counter. The clock generates clock pulses which are supplied to the counter. The latter is provided for receiving the clock pulses and counting them. Each time that a predetermined amount of clock pulses has been received, the counting amount of the counter is incremented. So, for example, if the counter is a minutes counter and after having received one clock pulse from a clock generating each minute a pulse, the counting amount is incremented by one unit. By using a 6 digit counter, a time period of 1.8 years can be counted before the counter is reset automatically to zero.

When the counter receives the monitoring signal generated under step 25-2, the counting amount indicated at that moment and thus representing an actual time period, will be stored into a further memory which is part of the period indicator. The storage of the counting amount is realised under control of the monitoring signal.

The contents of the further memory can be read, for example by a computer. As the counter has continued to count, the actual value indicated by the counting amount represents the actual time. By now deducing the stored counting amount from the actual amount indicated by the counter, the time that has lapsed since the generation of the monitoring signal can be determined by simple deduction. By now deducting that lapsed time from the actual time, the time at which the monitoring signal was generated can be determined. This enables to trace at what moment the monitoring signal was generated and consequently to check the behaviour of the jumper and verify, in case of accidental activation of the device, if the device has been correctly used and if the jumper has taken care of the usual safety regulations.

The device according to the present invention can also work in a second working configuration when this second working configuration has been selected as described here before. Upon selection of this second working configuration, the processing element will request (40) (FIG. 4) the jumper to enter the QNH value at the QNH input 6. The processing element will also request (41) the jumper to enter an elevation value indicating a height difference between mean sea level and the height of the planned drop zone. After having received the QNH value and the elevation value, the processing element will determine (42) on the basis of those values the reference pressure. Thereafter, the processing element will execute the same steps 24 to 37 as described here before. The gist of the present invention is thus to enable the processing element to determine a reference pressure in two different ways and thereafter to apply the same operation steps.

According to a preferred embodiment of the invention, the automatic activation device for a parachute is also provided to operate on a third working configuration. Just like the first and second working configurations, the third working configuration is selected by means of the selection means as described here before.

In the third working configuration, the processing element will request (50) the jumper to input a preset time at the time input 6. It could also be possible that this preset time is only requested upon installing the device and thereafter stored in the memory 3. The device also needs in this third working configuration a reference speed which is predetermined and stored in the memory 3, either upon manufacturing the device or during initialisation. The processing element will read (51) this reference speed and store it temporarily in a cache memory. During a jump, the processing element will use the actual pressure in an analogous manner as described for steps 24 and 25 in order to determine a second fall down speed, indicating a second speed at which the jumper and his parachute fall down. After determining the second speed, the processing element will compare 52 the second fall down speed with the stored reference speed. When the second fall down speed is less than the reference speed (52; N), the processing element returns to step 25. When on the other hand the second fall down speed has reached the reference speed (52; y), a start signal is generated (53). Under control of said start signal, the processor will verify (54) if the preset time has lapsed after generation of the start signal. If the preset time has lapsed (54; y) the processing element goes to step 30 for generating the control signal, when not, the processing element goes to step 32. Thereafter, the same steps 32 to 37 are executed as described here before.

The invention claimed is:

1. An automatic activation device for a parachute comprising, in at least first and second working configurations,
   a) pressure input means for input of at least
      a first pressure value corresponding to an actual atmospheric pressure value at a take-off zone, and
      a second pressure value corresponding to an atmospheric pressure value above a drop zone at a height when the second pressure value is input,
   b) multiple-input means for input of at least a QNH value and an elevation value,
   c) a processing element, connected to the pressure input means, operable for
      determining in the first configuration a reference pressure based on the first pressure value input,
      determining in the second working configuration a reference pressure based on the QNH value and elevation value,
      determining a series of subsequent pressure values based on the second pressure value in accordance with the reference pressure and at least two of the subsequent pressure values,
      determining a time value indicating an evaluated time for reaching the reference pressure,
      generating a correspondence signal upon. establishing that the evaluated time value has reached a predetermined value,
      determining, based on the series of subsequent pressure values, a first fall down speed,
      comparing the first fall down speed with a reference fall down speed under control of the correspondence signal,
      generating a control signal when the first fall down speed corresponds to or is higher than the reference fall down speed,
   d) an activation element, connected to the processing element, for activating opening of the parachute under control of a control signal generated by the processing element, and
   e) selection means enabling selection between at least the first and second working configurations.

2. The automatic activation device according to claim 1, wherein the multiple-input means is further for input of a preset time, wherein the processing element is further operable for
   determining the reference fall down speed in a third working configuration,
   determining, under control of the reference fall down speed and based on the subsequent pressure values of the series, a second fall down speed,
   comparing, within the third working configuration, the second fall down speed with the reference fall down speed,
   generating a start signal when the second fall down speed reaches the reference fall down speed, and
   generating, within the third working configuration, the control signal when a time period equal to the preset time has lapsed after generation of the start signal,
and wherein the selection means further enables selection of the third working configuration.

3. The automatic activation device according to claim 1, wherein the multiple-input means is further for input of an altitude correction value, and wherein the processing element is further operable for determining the reference pressure by taking into account the altitude correction value.

4. The automatic activation device according to claim 1, wherein the processing element comprises a memory for storing a set of predetermined altitude values, each of the predetermined altitude values being associated with a dedicated reference fall down speed, and wherein the selection means connects to the memory for selecting one of the predetermined altitude values and the reference fall down speed associated therewith.

5. The automatic activation device according to claim 1, wherein the processing element is further operable for determining the second pressure value by successively sampling the pressure and by determining an average value from a predetermined number of successively sampled pressures.

6. The automatic activation device according to claim. 1, wherein the processing element comprises a monitoring unit for receiving the first fall down speed, for comparing the first fall down speed with, the reference fall down speed, and for generating a monitoring signal when the first fall down speed is equal to or higher than the reference fall down speed.

7. The automatic activation device according to claim 6, further comprising a time period indicator containing a further memory for receiving the monitoring signal and for storing, into the further memory under control of the monitoring signal, an actual time period indicated by the time indicator upon receipt of the monitoring signal.

8. The automatic activation device according to claim 7, wherein the time period indicator further comprises a clock for generating clock pulses connected to a counter for receiving and counting the generated clock pulses and for incrementing a counting amount each time a predetermined amount of clock pulses is received.

9. The automatic activation device according to claim 1, further comprising a three axis linear accelerometer connected to the processing element and operable for detecting an acceleration value caused by a speed change in a fall down direction and for generating an acceleration signal when the acceleration value exceeds a predetermined threshold value, and wherein the processing element is further operable for both validating and, then, transmitting the control signal to the activation element once the acceleration signal is generated.

10. A method for activating opening a parachute comprising the steps of,
in a first configuration,
measuring a first pressure value indicating an actual atmospheric pressure value at a take-off zone,
determining in a first working configuration a reference pressure based on the first pressure value
subsequently measuring a second pressure indicating an atmospheric pressure above a drop zone at a height when the second pressure is measured,
determining a series of subsequent second pressure values,
determining a time value (i) based on the reference pressure and at least two of the subsequent pressure values and (ii) indicating an evaluated time for reaching the reference pressure,
generating a correspondence signal when the time value reaches a predetermined value,
determining, based on the subsequently determined pressure values, a first fall down speed,
comparing, under control of the correspondence signal, the first fall down speed with a reference fall down speed and, when the first fall down speed corresponds to or is higher than the reference fall down speed, generating a control signal,
activating opening the parachute under control of the control signal and, when operating in a second working configurations,
determining the reference pressure based on an input QNH value and an input elevation value indicating a height difference between mean sea level and a height of a drop zone and
selecting, by selection means, between at least the first working configuration and the second working configuration.

11. The method according to in claim 10, wherein, when operating in a third working configuration, a reference fall down speed is predetermined by the steps of
receiving a preset time,
determining, under control of the reference fall down speed and based on the subsequent pressure values, a second fall down speed,
comparing, within the third working configuration, the second fall down speed with the reference fall down speed and, when the second fall down speed reaches the reference fall down speed, generating a start signal, and
generating, within the third working configuration, the control signal when a time period equal to the preset time has elapsed.

12. The method according to claim 10, further comprising the steps of
receiving an altitude correction value and
determining the reference pressure by taking into account the altitude correction value.

13. The method according to claim 10, further comprising the steps of
comparing the first fall down speed with the reference fall down speed and
generating a monitoring signal when the first fall down speed is equal or higher than the reference fall down speed.

14. The method according to claim 13 further comprising the steps of
receiving the monitoring signal and
storing into a further memory under control of the monitoring signal upon receipt of the monitoring signal an actual time period indicated by a time indicator.

15. The method according to claim 14 further comprising the steps of
generating clock pulses,
receiving the clock pulses,
counting the clock pulses, and
incrementing a counting amount each time a predetermined amount of clock pulses is counted.

16. The method according to claim 14, wherein the actual time period is read from the further memory, and wherein a local actual time and the time period are processed for determining a clock time at which the monitoring signal was generated.

17. The method according to claim 10, further comprising the steps of
measuring an acceleration value caused by a speed change in a fall down direction,
generating an acceleration signal upon detecting the acceleration value exceeds a predetermined threshold value, and
validating and, then, transmitting the control signal to the activation element upon establishing that the acceleration signal has been generated.

\* \* \* \* \*